May 24, 1938.  G. K. E. KLEEBERG  2,118,561
RIVET
Filed April 6, 1936
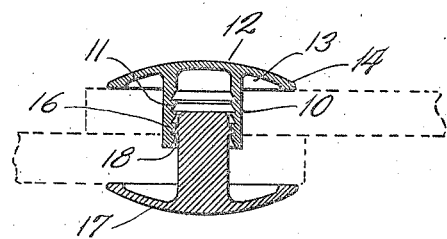
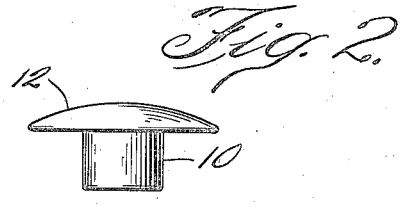
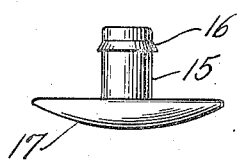
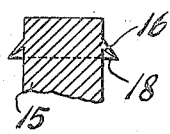
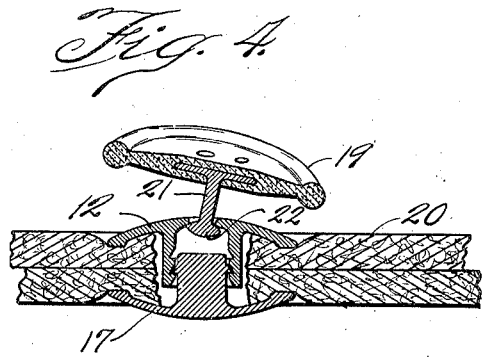
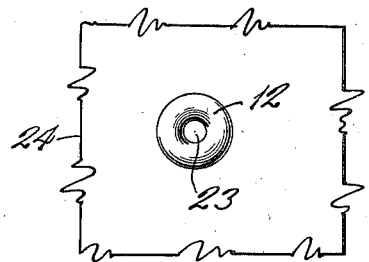
Inventor:
Gunther K. E. Kleeberg
By Casper L. Redfield  Atty.

Patented May 24, 1938

2,118,561

UNITED STATES PATENT OFFICE 2,118,561

RIVET

Gunther K. E. Kleeberg, Chicago, Ill.

Application April 6, 1936, Serial No. 72,939

4 Claims. (Cl. 85—37)

My invention relates to rivets for securing two or more parts firmly and permanently together. More particularly, it relates to rivets consisting of two parts which may be put together by a moderate pressure. In rivets of smaller sizes, this pressure may be a manual one by use of the fingers only, but in larger sizes it would require a pair of pliers, or other pressure device. Or a single blow of a hammer may be used.

The rivet may be used, in different sizes, for anything from securing two sheets of paper together to securing together several metal plates. Each rivet adapts itself automatically to different thicknesses of parts secured together. This adaptation is primarily by resiliency in the heads of the rivets, and secondarily by a plurality of steps in the securing means. These two are related to each other so that the resiliency in the heads will accommodate a greater variation in thickness of parts secured together than is the distance between steps in the securing means.

In the accompanying drawing:

Fig. 1 is a vertical section, at an enlarged scale, of one of the smaller sizes of rivet shown in position as securing two parts together, the parts or plates being indicated by dotted lines;

Figs. 2 and 3 are elevations of the two parts of Fig. 1 shown separately;

Fig. 4 is a section illustrating the rivet as being used to secure a button to a garment;

Fig. 5 is a plan illustrating the rivet used as an eyelet extending thru a body in which the rivet is inserted; and Fig. 6 is a still more enlarged detail.

The part 10 is a cylindrical body or shank of slightly resilient material, such as stainless steel. This shank is bored out and has interior annular teeth 11 cut therein. These teeth have the general appearance of being ratchet teeth. The number of such teeth may vary from one to a considerable number, depending upon the particular service for which the rivet is intended. The head 12 is undercut as shown at 13. This undercut leaves the metal between the shank 10 and rim 14 thin so that it may yield elastically under pressure on the center of the head with the rim resting on a support. The parts 10 to 14 constitute the receiving member of the rivet.

The entering member consists of a shank 15 having an exterior annular tooth 16 and a head 17 which preferably corresponds in every particular with the head 12. The tooth 16 is undercut as shown at 18 in Fig. 1, and has an exterior outside diameter which is slightly greater than is the inside diameter of teeth 11. The consequence of this structure is that when the entering member is pushed into the receiving member, the beveled faces of teeth 11 and 16 engage each other as wedges which act to compress tooth 16 and to expand the body 10. This compression and expansion does not need to be much. It is sufficient if it is something more than nothing. When the points of teeth 11 and 16 pass each other, the resiliency of metal causes the teeth to catch on each other, and any strain tending to separate the parts only acts to lock them together by expanding the tooth 16. If the two parts of the rivet are pressed together until the heads 12 and 17 are brought firmly into contact with the layers of material to be secured together, then the elasticity of the heads will furnish that locking strain.

In Fig. 4, I have shown the rivet acting to secure a button 19 to a fabric 20 consisting of two layers of cloth. In this case, the button is fast to a stem 21 which passes thru an opening in head 12, and has a head 22 inside of the receiving member. This view not only shows the rivet as a button holder, but suggests the application of the rivet as a means for securing various devices to any body thru which the rivet may pass.

In Fig. 5, the rivet has an opening 23 which extends axially thru both parts, and thus serves as an eyelet thru the body 24 in which the rivet is secured.

I have shown both heads as being undercut so that each of them may act as resilient means for locking the parts permanently together when teeth 11 and 16 are properly in engagement with each other. It will be evident that one head alone may perform this function, and that the other may correspond to an ordinary rivet head. The object of dividing the required elastic deformability between two heads is to avoid the weakness of a head by making the metal thereof thinner than necessary.

In the structure shown in Fig. 4, the material 20 furnishes part of the elastic tension. It will be evident that elastic material inserted between the heads 12 and 17 will serve to operate the toothed locking means, even if there should be little or no elasticity in the heads themselves.

I have shown the plurality of teeth on the receiving member, and the single tooth on the entering member. It will be evident that this arrangement may be reversed without departing from the spirit of the invention. It will also be evident that if they are made for securing parts of definite thickness together, one tooth on each member will be sufficient.

What I claim is:

1. A rivet consisting of a receiving member having an uninterrupted interior annular tooth effective as a ratchet tooth, and an integral entering member having an uninterrupted exterior annular tooth of a similar character, the outer diameter of the exterior tooth being slightly greater than the inner diameter of the interior tooth, the difference between said diameters being within the elasticity of the material of which the members are made.

2. A two-part rivet consisting of a receiving member and an entering member, each member being provided with an uninterrupted annular tooth adapted to engage with the tooth of the other member, one of said teeth being undercut so that it may be elastically deformed when the two parts are pressed together.

3. A rivet member having a resilient head and a tubular body provided with a plurality of uninterrupted interior spaced teeth effective as ratchet teeth, and a cooperating member having a similar head and a cylindrical body provided with an uninterrupted exterior tooth adapted to interact with any one of the spaced teeth when the second body is inserted in the first body, the effective resiliency of the heads being greater than the distance between two adjacent teeth of said spaced teeth.

4. A two-part rivet consisting of a receiving member and an entering member, said members having uninterrupted interengaging teeth, the tooth or teeth of one member being elastically deformable when the parts are pressed together, and each member being provided with an integral head, one of said heads being elastically deformable whereby it is given an elastic tension when the rivet is used to secure two pieces together.

GUNTHER K. E. KLEEBERG.